United States Patent
Motta et al.

(10) Patent No.: US 7,261,503 B2
(45) Date of Patent: Aug. 28, 2007

(54) MULTI-AXIS MACHINE TOOL

(75) Inventors: Stefano Motta, Turin (IT); Sandro Foletti, Piacenza (IT)

(73) Assignee: JOBS S.p.A., Piacenza (IT)

( * ) Notice: Subject to any disclaimer, the term of this patent is extended or adjusted under 35 U.S.C. 154(b) by 39 days.

(21) Appl. No.: 11/332,184

(22) Filed: Jan. 17, 2006

(65) Prior Publication Data

US 2006/0159540 A1 Jul. 20, 2006

(30) Foreign Application Priority Data

Jan. 17, 2005 (IT) .......................... BO2005A0021

(51) Int. Cl.
*B23C 9/00* (2006.01)
*B23Q 5/28* (2006.01)
*B23Q 1/25* (2006.01)
*B23Q 1/00* (2006.01)
*B23C 1/12* (2006.01)

(52) U.S. Cl. .......................... 409/235; 409/201; 310/12

(58) Field of Classification Search ................ 409/235, 409/201, 135, 238, 239, 136; 310/12, 15–17; 82/149, 900; 451/340, 342, 360, 361, 363; 408/234, 236, 237
See application file for complete search history.

(56) References Cited

U.S. PATENT DOCUMENTS 2,859,643 A * 11/1958 McIver ........................ 82/149
3,484,065 A * 12/1969 Walter ........................ 409/238
4,382,820 A * 5/1983 Inoue ........................ 264/261
5,368,425 A * 11/1994 Mills et al. .................. 409/235
5,938,577 A * 8/1999 Lindem ........................ 483/30
2004/0077470 A1* 4/2004 Camozzi et al. .............. 483/31
2004/0104694 A1* 6/2004 Nakamoto et al. .......... 318/135
2004/0140721 A1* 7/2004 Chang et al. .................. 310/12
2005/0034289 A1* 2/2005 Hosoe ........................ 409/235
2006/0232141 A1* 10/2006 Teramachi et al. ............ 310/12

FOREIGN PATENT DOCUMENTS

DE          9217237 U1 *  4/1993
EP          1506836 A1 *  2/2005
EP          1681132 A1 *  7/2006
JP          62-292335 A  * 12/1987
JP          63-200947 A  *  8/1988

OTHER PUBLICATIONS

Machine Translation of DE 9217237.7U1, 8 pages.*

* cited by examiner

*Primary Examiner*—Erica Cadugan
(74) *Attorney, Agent, or Firm*—Timothy J. Klima

(57) ABSTRACT

In a multi-axis machine tool comprising a slide way aligned on a longitudinal axis, a traveling column coupled via one end with the slide way, an arm mounted slidably to the column and traversable at least in a first direction normal to the longitudinal axis of the slide way, and a machining head carried by the arm, the material used for the arm is one typified by low thermal expansion.

23 Claims, 2 Drawing Sheets

MULTI-AXIS MACHINE TOOL

This application claims priority to Italian Patent Application No. BO2005A000021, filed Jan. 17, 2005, which is incorporated by reference herein.

BACKGROUND OF THE INVENTION

The present invention relates to a multi-axis machine tool comprising a slide way extending along a longitudinal axis, a column associated slidably by way of one end with the slide way, an arm coupled slidably with the column, and a machining head mounted to the arm.

In particular, the invention is applicable to the art field of numerically controlled multi-axis machine tools used typically to perform high-speed milling and other such machining operations.

Conventionally, such machine tools are utilized particularly in the aerospace industries for contouring and drilling parts made of aluminum and composite materials, and in the automobile sector for producing master models, and models for bodywork, internal parts and dies.

Multi-axis machines of the type in question present a structure made entirely of steel which, in the course of the various movements, will absorb heat produced by the electric motors needed to induce motion and by the friction generated between moving parts during operation.

The exposure of these parts to heat can result in their deformation.

In particular, deformation of the arm caused by heat is especially critical.

Indeed thermal expansion changes the dimensions of the arm, especially the predominating dimension, and consequently the position of the machining head, relative to a reference rigidly associated with the work, with the result that the accuracy of machining operations is jeopardized.

In the light of the foregoing, the main object of the present invention is to provide a multi-axis machine tool unaffected by the aforementioned drawbacks.

In particular, the object of the invention is to set forth a multi-axis machine tool of which the machining accuracy will not be rendered unreliable as the result of heat generated by the machine during operation.

SUMMARY OF THE INVENTION

The stated objects are realized according to the present invention in a multi-axis machine tool comprising a slide way aligned on a longitudinal axis, a travelling column coupled via one end with the slide way, an arm mounted slidably to the column and traversable at least in a first direction normal to the longitudinal axis of the slide way, and a machining head carried by the arm. Of the various machine components, at least the arm is fashioned from a material, preferably composite or ceramic, typified by low thermal expansion.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
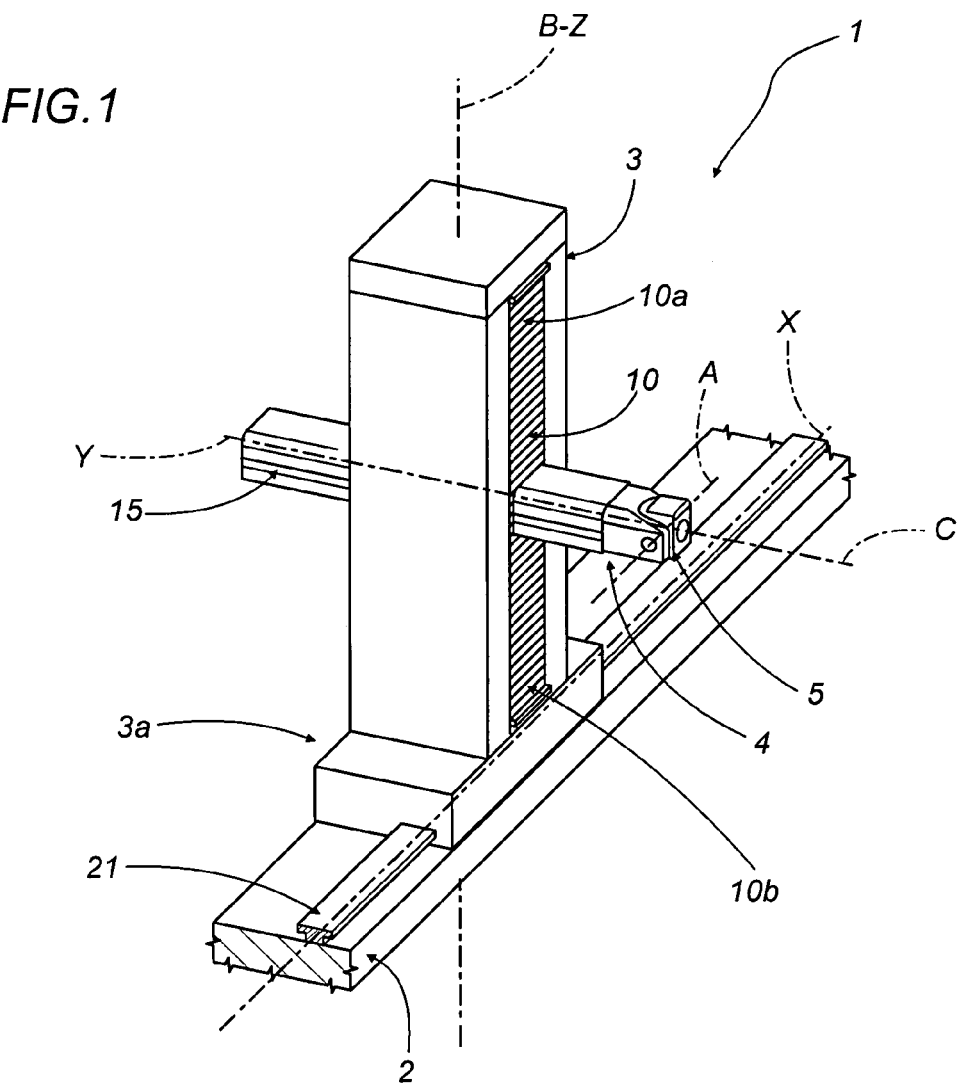
FIG. 1 shows a multi-axis machine tool according to the present invention, viewed in perspective.

With reference to the drawings, numeral 1 denotes a multi-axis machine tool, in its entirety.

The multi-axis machine tool 1 comprises a slide way 2 extending along a longitudinal axis X of the machine 1 that defines a first direction of motion, and a column 3 coupled by way of one end 3a to the slide way 2. The column 3 is also rotatable relative to the slide way 2 about a first axis B perpendicular to the aforementioned longitudinal axis X. The machine 1 further comprises an arm 4 coupled slidably with the column 3, capable of movement along at least a first direction Z perpendicular to the axis X of the slide way 2 and coinciding with the first axis B about which the column 2 is rotatable relative to the slide way 2. Also forming part of the machine 1 is a machining head 5 mounted to the arm 4, such as can be fitted with a tool (not illustrated).

The machining head 5 is pivotable relative to the arm 4 about two mutually perpendicular axes C and A, identifiable in particular as a second axis A parallel to the axis X of the slide way 2, and a third axis C perpendicular both to the axis X of the slide way 2 and to the first direction Z along which the arm 4 is traversable relative to the column 3.

The arm 4 is coupled to the column 3 by way of a sleeve 6 and able to traverse along the selfsame column 3 in the first direction Z. The sleeve 6 presents an outer surface 6a of substantially prismatic geometry, and an internal bore 6b shaped substantially to match a cross sectional profile of the arm 4. More exactly, the arm 4 appears as a right prism and is thus slidable internally of the sleeve 6 so as to allow the arm 4 a further degree of freedom relative to the column 3, along a second direction Y perpendicular both to the first direction Z and to the longitudinal axis X of the slide way 2.

In particular, the second direction Y along which the arm 4 and column 3 are slidably coupled coincides with the second rotational axis C of the machining head 5. Thus, the machining head 5 is capable of movement along and/or about six distinct axes X, Y, Z, A, B and C and can be positioned freely at any given point on a three-dimensional workpiece.

Preferably, at least the arm 4 will be made of a low thermal expansion material (LTEM). In the context of the present specification and the appended claims, a low thermal expansion material would be one having a coefficient of linear thermal expansion (CLTE) much lower than that of steel, which is in the region of $11*10^{-6}$ $C.^{-1}$. Advantageously, the material employed will have a CLTE of less than $3*10^{-6}$ $C.^{-1}$, possibly between $-1*10^{-6}$ $C.^{-1}$ and $1*10^{-6}$ $C.^{-1}$, and preferably between $-0.5*10^{-6}$ $C.^{-1}$ and $0.5*10^{-6}$ $C.^{-1}$.

Likewise advantageously, the low thermal expansion material in question will be a composite containing carbon fiber. In particular, carbon fiber typically has negative coefficients of linear thermal expansion ranging between $-1*10^{-6}$ $C.^{-1}$ and $-0.3*10^{-6}$ $C.^{-1}$. The structure of carbon fiber composite is such that coefficients of linear thermal expansion CLTE, whether positive or negative, will in any event be close to zero.

Alternatively, the low thermal expansion material could be a ceramic material or a composite of silicon carbide and its derivatives, albeit no limitation is implied.

To enable the arm 4 to traverse on the column 3 along the first direction Z, the sleeve 6 presents at least one shoe 7 coupled with a first rail 8 mounted to the column 3 and extending along the selfsame first direction Z. In particular, the first rail 8 can be accommodated in an opening 9 presented by the column 3 and extending parallel to the first direction Z. In this instance, as discernible from FIG. 1, the column 3 is equipped with a rolling shutter 10 composed of two parts 10a and 10b that accompany the translational movement of the sleeve 6, hence also of the arm 4, along the selfsame column 3; this ensures that chips from machining will not interfere accidentally with the operation of the first rail 8 and the first shoe 7. Whilst in the preferred embodiment of FIG. 2, the column 3 is equipped with a single rail 8 and the sleeve 6 with a single shoe 7, the column 3 might equally well be furnished with two parallel and mutually opposed rails 8, and the sleeve 6 with two corresponding shoes 7 engaging the two rails 8.

The machine tool 1 further comprises a first linear electric motor 11, wired to a master control unit (not illustrated), by which motion is induced in the sleeve 6. The first linear motor 11 presents a stator 12 mounted to the column 3, extending parallel to the first rail 8, and a magnet 13 associated with the sleeve 6.

Figure 2:
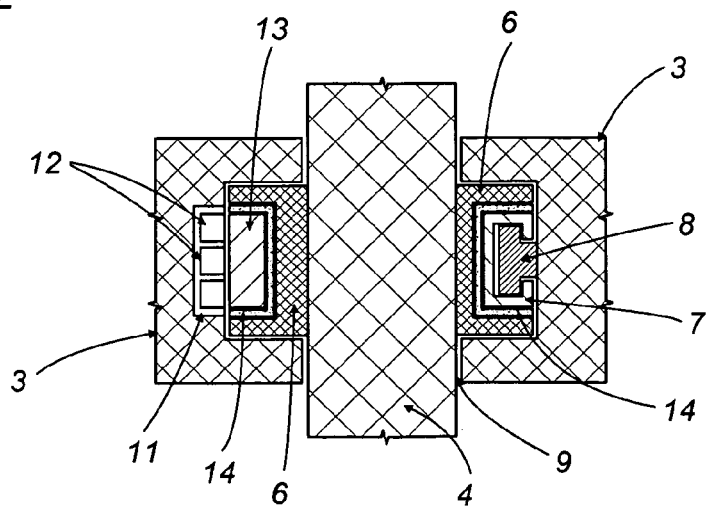
FIG. 2 shows a first detail of the machine in FIG. 1, viewed in section.

To advantage, the sleeve 6, like the arm 4, is fashioned from a low thermal expansion material. In this instance, given that the magnet 13 is metallic and thus liable to expand thermally, a layer 14 of resilient material will be interposed between the magnet 13 and the sleeve 6, as illustrated in FIG. 2, so as to absorb the thermal expansion of the metal. The resilient material could be a film of adhesive or a layer of resin, both familiar to a person skilled in the art.

Preferably, moreover, the first shoe 7 and the first rail 8 will also be metallic. Accordingly, a layer 14 of resilient material is interposed likewise between the shoe 7 and the sleeve 6 in order to prevent internal stresses from being generated at the interface between these same components.

Figure 3:
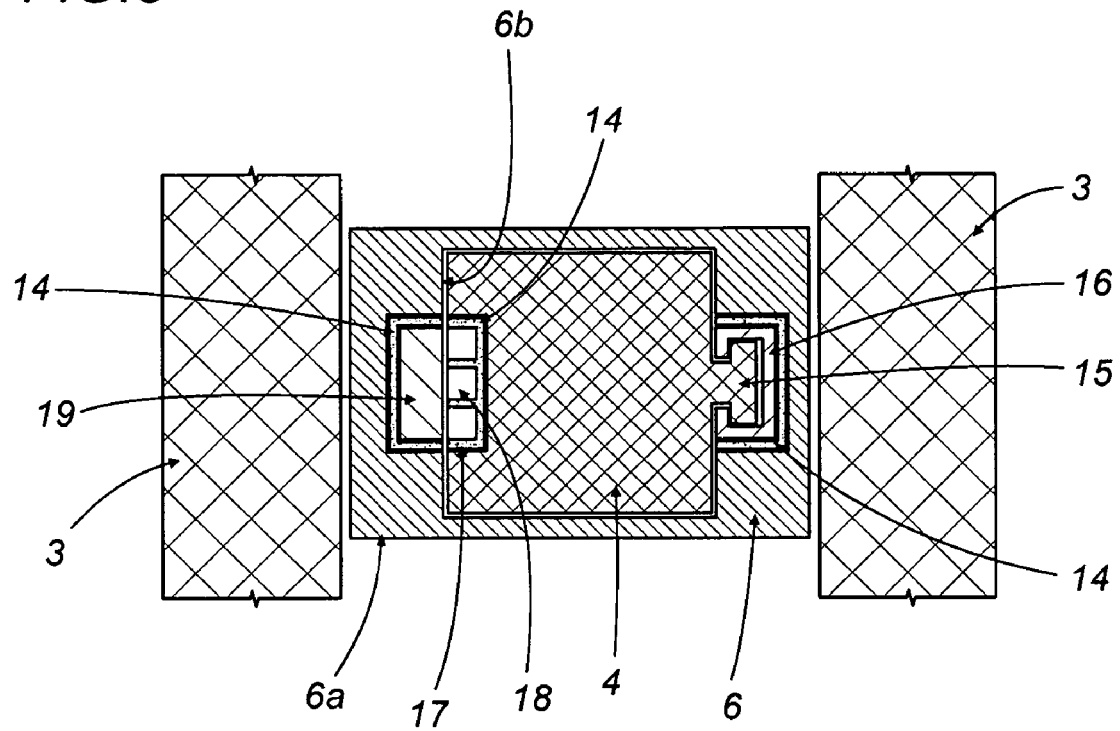
FIG. 3 shows a second detail of the machine in FIG. 1, viewed in section.

Similarly, to enable the movement of the arm 4 transversely to the column 3, that is to say along the second direction Y, the arm 4 is furnished with at least one second rail 15 extending parallel with the second direction Y and coupled with a second shoe 16 mounted to the sleeve 6, and more exactly in the bore 6b of the sleeve 6. Likewise in this instance, the machine tool 1 is equipped with a second linear electric motor 17, wired to the aforementioned master control unit, by which motion is induced in the arm 4. The second linear motor 17 presents a stator 18 mounted to the arm 4, extending parallel to the second rail 15, and a magnet 19 associated with the sleeve 6; more exactly, the magnet 19 is installed in the bore 6b of the sleeve 6 as illustrated in FIG. 3.

Advantageously, a layer 14 of the aforementioned resilient material will be interposed between the stator 18 and the arm 4, serving to absorb thermal expansion.

Moreover, the second shoe 16 is made of metal. The second rail 15, on the other hand, is fashioned from a low thermal expansion material. In practice, the second rail 15 could be machined directly from the material of the arm, or embodied separately and applied to the arm 4. A layer 14 of resilient material is interposed between the sleeve 6 and the second shoe 16, as indicated in FIG. 3, so as to prevent internal stresses from being generated at the interface between the two components. Likewise in FIG. 3, only a single second shoe 16 and a single second rail 15 are illustrated, whereas the arm 4 might equally well be furnished with two mutually opposed rails 15, and the sleeve 6 with two corresponding second shoes 16 engaging the two second rails 15.

The column 3 engages with the slide way 2 by way of a third shoe 20, presented by the end 3a of the column 3 and coupled with a third rail 21 mounted to the slide way 2.

Figure 4:
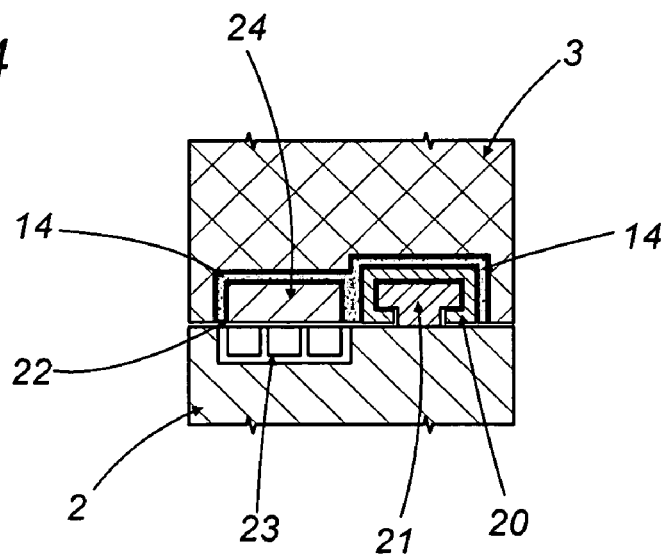
FIG. 4 shows a third detail of the machine in FIG. 1, viewed in section.

A third linear motor 22 comprises a stator 23 mounted to the slide way 2, extending parallel to the third rail 21, and a magnet 24 associated with the end 3a of the column 3 (see FIG. 4). Like the first two linear motors, the third linear electric motor 22 is wired to the master control unit, by which its movements are coordinated with those of the other two motors.

In a preferred embodiment, the column 3 will be embodied in the same low thermal expansion material as the arm 4 and the sleeve 6. Here too, a layer 14 of the aforementioned resilient material is applied to the magnet 24 of the third linear motor 22, and preferably to the third shoe 20, as a means of absorbing thermal expansion. A single third shoe 20 and a single third rail 21 are shown in FIG. 4, whereas use might be made of two third shoes 20 and two third rails 21.

The drawbacks mentioned at the outset are overcome by the present invention, and the stated objects duly realized.

First and foremost, the adoption of a low thermal expansion material for the construction of the arm is instrumental in limiting elongation and thus maintaining the position of the machining head steady in relation to the workpiece. Accordingly, a machine tool according to the present invention guarantees greater precision in machining than is possible with machines of the prior art, and this same precision is unaffected by the temperatures registering in its component parts.

Adopting composite materials, moreover, the overall weight of the machine can be reduced in comparison with machines of the prior art, and the power of electric motors thus trimmed, without any loss of performance. The reduction of weights and rated power also means that less heat is generated directly by the linear electric motors, and less also by friction, so that elongation of the arm is reduced further.

What is claimed is:

1. A multi-axis machine tool, comprising:
    a slide way aligned on a longitudinal axis;
    a column slidably associated, by way of one end, with the slide way;
    an arm, coupled slidably with the column and traversable thereon at least in a first direction perpendicular to the longitudinal axis of the slide way;
    a machining head carried by the arm;
    wherein the arm, at least, is embodied in a Low Thermal Expansion Material;
    wherein at least one of the arm and the column is slidably actuated by at least one linear motor, and wherein a motion actuation component of the at least one linear motor is positioned adjacent a layer of resilient material able to absorb the expansion of the at least one motion actuation component.

2. A machine tool as in claim 1, comprising a sleeve interposed between the arm and the column, by way of which the arm is coupled slidably to the column.

3. A machine tool as in claim 2, comprising at least one first shoe mounted to the sleeve and coupled with a first rail extending along the column in the first direction.

4. A machine tool as in claim 3, wherein the sleeve is embodied in a low thermal expansion material.

5. A machine tool as in claim 4, wherein the at least one first shoe is made of metallic material and interfaced with the low thermal expansion material of the sleeve by way of a layer of resilient material able to absorb the expansion of the at least one first shoe.

6. A machine tool as in claim 3, wherein the at least one linear motor includes a first linear motor composed of a stator mounted to the column, parallel to the first rail, and wherein a magnet of the first linear motor is associated with the sleeve.

7. A machine tool as in claim 6, wherein the magnet of the first linear motor is interfaced with low thermal expansion material of the sleeve by way of the layer of resilient material able to absorb the expansion of the magnet.

8. A machine tool as in claim 7, wherein the arm is coupled slidably with the sleeve and traversable in a second direction perpendicular both to the first direction and to the longitudinal axis of the slide way.

9. A machine tool as in claim 8, comprising at least one second rail mounted to the arm, extending parallel to the second direction and coupled with a second shoe mounted to the sleeve.

10. A machine tool as in claim 9, wherein the at least one second rail is embodied in a low thermal expansion material, whilst the second shoe is made of metallic material and coupled to the material of the sleeve by way of a layer of resilient material able to absorb the expansion of the self-same second shoe.

11. A machine tool as in claim 8, wherein the at least one linear motor includes a second linear motor composed of a stator mounted to the arm, parallel to the at least one second rail, and wherein a magnet of the second linear motor is associated with the sleeve.

12. A machine tool as in claim 11, wherein the stator of the second linear motor is interfaced with the low thermal expansion material of the arm, and wherein the magnet of the second linear motor is interfaced with the sleeve, by way of respective layers of resilient material able to absorb the expansion of the interfaced components.

13. A machine tool as in claim 1, wherein the column is embodied in a low thermal expansion material.

14. A machine tool as in claim 13, comprising at least one shoe mounted to the end of the column and coupled with a rail presented by the slide way.

15. A machine tool as in claim 14, wherein the at least one shoe is made of metallic material and interfaced with the low thermal expansion material of the column by way of a layer of resilient material able to absorb the expansion of the selfsame shoe.

16. A machine tool as in claim 14, wherein the at least one linear motor includes a linear motor composed of a stator mounted to the slide way, parallel to the rail presented by the slide way, and wherein a magnet is associated with the end of the column.

17. A machine tool as in claim 16, wherein the magnet is interfaced with the low thermal expansion material of the column by way of the layer of resilient material able to absorb the expansion of the magnet.

18. A machine tool as in claim 1, wherein the low thermal expansion material has a Coefficient of Linear Thermal Expansion less than $3*10^{-60}C^{-1}$.

19. A machine tool as in claim 18, wherein the Coefficient of Linear Thermal Expansion is between $-1*10^{-60}C^{-1}$ and $1*10^{-60}C^{-1}$.

20. A machine tool as in claim 1, wherein the low thermal expansion material is a composite material containing carbon fiber.

21. A machine tool as in claim 1, wherein the low thermal expansion material is a composite material containing silicon carbide or derivatives thereof.

22. A machine tool as in claim 1, wherein the low thermal expansion material is a ceramic material.

23. A multi-axis machine tool, comprising:

a slide way aligned on a longitudinal axis;

a column slidably associated, by way of one end, with the slide way;

an arm, coupled slidably with the column and traversable thereon at least in a first direction perpendicular to the longitudinal axis of the slide way;

a machining head carried by the arm;

wherein the arm, at least, is embodied in a Low Thermal Expansion Material, and wherein at least one of the column, arm, and a sleeve interposed between the arm and the column, are slidably moveable along at least one guide rail, and said at least one of the column, arm, and sleeve have at least one metallic shoe coupled thereto that is coupled with said at least one guide rail, wherein said at least one shoe is interfaced with said at least one of the column, arm, and sleeve by way of a layer of resilient material able to absorb the expansion of the at least one shoe.

* * * * *